Patented Aug. 20, 1935

2,011,805

UNITED STATES PATENT OFFICE 2,011,805

PROCESS OF PREPARING 1,4,5,8-NAPHTHALENE - TETRA - CARBOXYLIC ACID AND SUBSTITUTION PRODUCT THEREOF

Wilhelm Eckert, Heinrich Sieber, and Heinrich Greune, Frankfort-on-the-Main-Hochst, and Gerhard Langbein, Hofheim in Taunus, Germany, assignors to General Aniline Works, Inc., New York, N. Y., a corporation of Delaware No Drawing. Application August 27, 1930, Serial No. 478,312. In Germany September 28, 1929

7 Claims. (Cl. 260—108)

The present invention relates to a process of preparing 1,4,5,8 - naphthalene - tetra-carboxylic acid and substitution products thereof.

We have found that 1,4,5,8-naphthalene-tetra-carboxylic acid and substitution products thereof may be obtained in good yields by treating with an oxidizing agent a cyclic ketone of acenaphthene or a derivative thereof of the general probable formula:

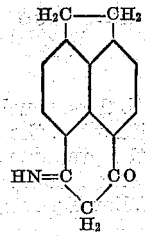

The oxidation may be carried out in an acid solution, for instance in glacial acetic acid or dilute sulfuric acid by means of sodium bichromate or potassium bichromate, chromic acid or the like, as well as in an alkaline solution for instance by means of potassium permanganate. Instead of the free cyclic ketones the salts thereof, as for instance the hydrochlorides or the sulfates may be subjected to the oxidation. They are to be considered as equivalent starting materials and are therefore within the scope of the following claims.

The cyclic ketones of the acenaphthene or its derivatives used as starting materials are obtainable by treating the condensation products, obtainable from cyanoacetylchloride and acenaphthene or its derivatives, of the following constitution:

with condensing agents as for instance aluminium chloride, aluminium chloride mixed with salts or the like (compare U. S. Patents 1,972,219 and 1,913,798). The cyclic ketones have the following constitution II:

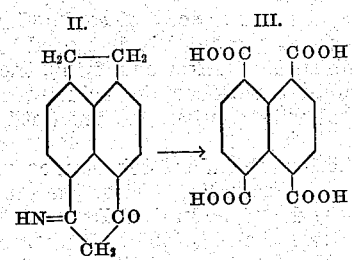

wherein the naphthalene nucleus may be substituted or not.

They are transformed into the corresponding naphthalene-tetra-carboxylic acid as represented in the above formula III by means of oxidizing agents. The 1,4,5,8-naphthalene-tetra-carboxylic acid or its derivatives, obtainable according to the said process in good yield, represent intermediate products of value for the preparation of dyestuffs.

The following examples illustrate the invention, but they are not intended to limit it thereto, the parts being by weight:

(1) 44 parts of cyclic ketone of the acenaphthene in the form of its hydrochloride of the probable formula:

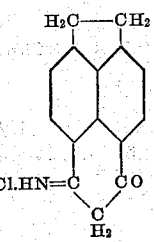

or the corresponding quantity of the free ketone (obtainable according to U. S. Patent No. 1,913,798, dated June 13, 1933) are suspended in about 1000 parts of caustic soda solution of 4 per cent strength and the whole is heated up to 90° C.–100° C. About 180 parts of potassium permanganate in the form of a warm aqueous solution of 10 per cent strength are added to this mixture little by little until no further separation of pyrolusite takes place. The pyrolusite is filtered with suction and the 1,4,5,8-naphthalene-tetra-carboxylic acid thus formed is precipitated in the filtrate by means of concentrated hydrochloric acid, filtered with suction, washed until neutral and dried. After the filtrate has been allowed to stand for a prolonged time further quantities of the acid can be obtained therefrom.

(2) 5 parts of cyclic ketone of the acenaphthene in the form of its hydrochloride as used in Example 1 or the corresponding quantity of the free ketone are dissolved in 50 parts of concentrated sulfuric acid of 95 per cent strength and the solution is poured on 200 parts of ice. 25 parts of sodium bichromate are gradually entered at a temperature of 50° C. The temperature is kept for 2 hours at 50° C. and then for about 7 hours at 70° C. The 1,4,5,8-naphthalene-tetra-carboxylic acid thus formed is filtered with suction, washed until neutral and dried.

(3) 10 parts of cyclic ketone of the acenaphthene in the form of its hydrochloride (as referred to in the preceding examples) are suspended in 120 parts by volume of caustic soda solution of 10 per cent strength. 150-200 parts by volume of a commercial chloride of lime liquor are then gradually added drop by drop at room temperature and the whole is heated for about 9 hours at 80° C. After cooling any excess of sodium hypochlorite which may be present is destroyed by means of sodium bisulfite. After acidifying, the 1,4,5,8-naphthalene-tetra-carboxylic acid precipitates. It is filtered with suction, washed until neutral and dried.

The 1,4,5,8-naphthalene-tetra-carboxylic acid as described in Examples 1-3 has the same properties as that described in U. S. Patent No. 1,612,103 dated December 28, 1926 to Wilhelm Eckert; it represents a white crystalline powder which, when carefully heated to an elevated temperature, is transformed with elimination of water into the di-anhydride. The said acid is very resistant; it can for instance be recrystallized from nitric acid whereby it is likewise converted into its yellowish di-anhydride. The yield of 1,4,5,8-naphthalene-tetra-carboxylic acid is satisfactory.

(4) 8 parts of ketimide hydrochloride of 2-chloro-acenaphth-peri-indandion of the following constitution:

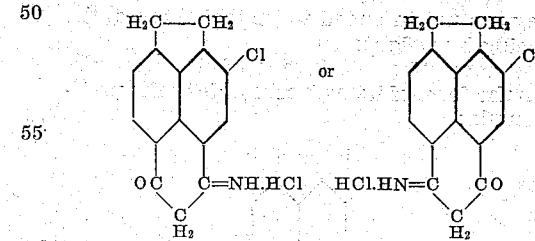

are finely dispersed in a solution of 32 parts of sodium bichromate in 200 parts of water. 112 parts of sulfuric acid of 60° Bé. are added to the suspension drop by drop at a temperature of 50° C., while well stirring. At 55° C.-60° C. stirring is continued until the oxidation is complete. The 2-chloro-1,4,5,8-naphthalene-tetra-carboxylic acid thus obtained of the following constitution:

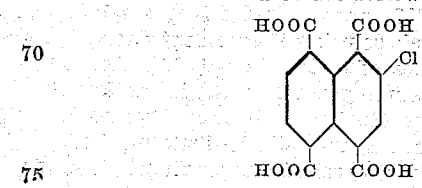

is filtered with suction, washed until neutral and dried. It represents as free acid a nearly white powder which is soluble in alkalies and which can be precipitated again by means of acids. The 2-chloro-1,4,5,8-naphthalene-tetra-carboxylic acid crystallizes in the form of clustered prisms and melts at above 300° C. On heated up to an elevated temperature it is transformed while assuming a yellow coloration into its di-anhydride of the following constitution:

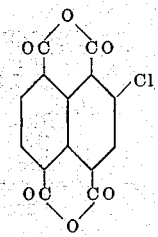

It dissolves in concentrated sulfuric acid to a colorless solution. The yield is satisfactory.

We claim:

1. The process which comprises subjecting a compound of the following formula:

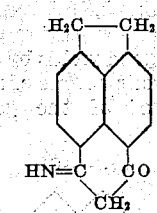

wherein the naphthalene nucleus may contain chlorine as a substituent to the action of a strong oxidizing agent in the presence of a diluent.

2. The process which comprises subjecting a compound of the following formula:

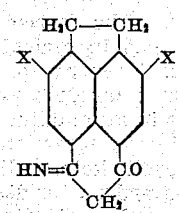

wherein one of the X's stands for hydrogen, the other X for hydrogen or chlorine, to the action of a strong oxidizing agent in the presence of a diluent.

3. The process which comprises subjecting a compound of the following formula:

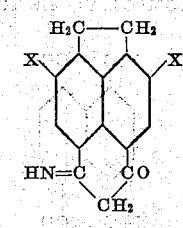

wherein one of the X's stands for hydrogen, the other X for hydrogen or chlorine, to the action of a strong oxidizing agent in the presence of a diluent at a temperature between 50° C.-110° C.

4. The process which comprises subjecting a compound of the following formula:

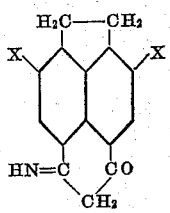

wherein one of the X's stands for hydrogen, the other X for hydrogen or chlorine to the action of sodium bichromate in the presence of sulfuric acid at about 50° C. to about 70° C.

5. The process which comprises subjecting a compound of the following formula:

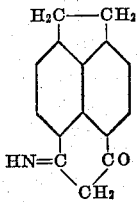

to the action of potassium permanganate in the presence of an aqueous solution of caustic soda at about 90° C. to about 100° C.

6. The process which comprises subjecting a compound of the following formula:

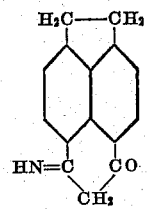

to the action of sodium hypochlorite in the presence of an aqueous solution of caustic soda at about 80° C.

7. 2-chloro - 1,4,5,8 - naphthalene - tetra - carboxylic acid being a nearly white powder soluble in caustic alkalies, crystallizing in the form of prisms, melting above 300° C. and dissolving in concentrated sulfuric acid to a colorless solution.

WILHELM ECKERT.
HEINRICH SIEBER.
HEINRICH GREUNE.
GERHARD LANGBEIN.